June 24, 1947.  W. W. MacARTHUR ET AL  2,422,838
APPARATUS FOR FLANGING SHEET METAL STRIPS
Filed March 8, 1946
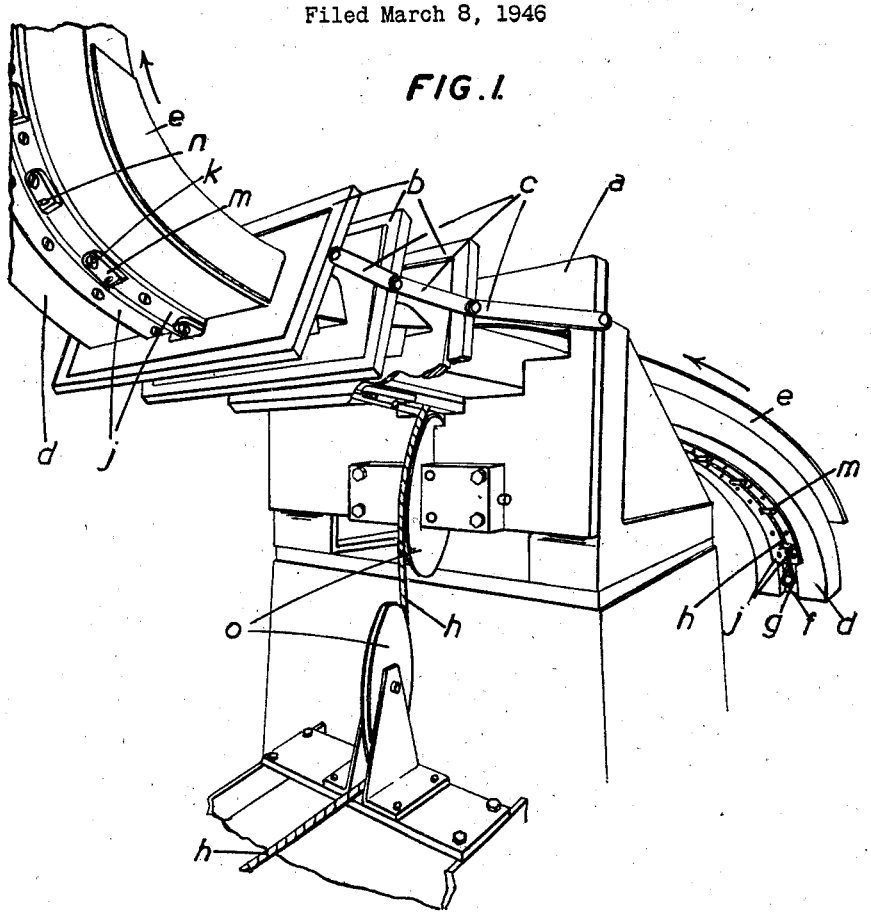
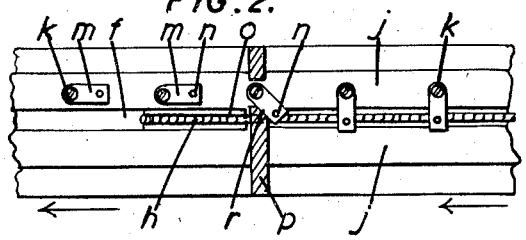
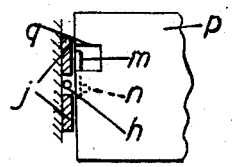
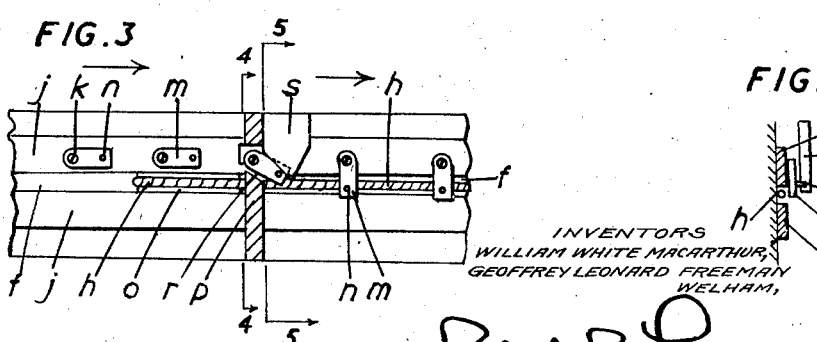
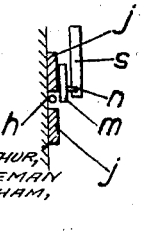
INVENTORS
WILLIAM WHITE MACARTHUR,
GEOFFREY LEONARD FREEMAN
WELHAM,
BY Robert B. Pearson
ATTORNEY Patented June 24, 1947

2,422,838

UNITED STATES PATENT OFFICE 2,422,838

APPARATUS FOR FLANGING SHEET METAL STRIPS

William White MacArthur, Gerrards Cross, and Geoffrey Leonard Freeman Welham, South Ruislip, England, assignors to The Fairey Aviation Company Limited, Hayes, Middlesex, England Application March 8, 1946, Serial No. 652,950
In Great Britain January 19, 1945

3 Claims. (Cl. 153—3)

In the specification of application for Letters Patent Serial No. 524,280, filed by Edward John Boddy on February 28, 1944 and issued as Patent No. 2,420,064 on May 6, 1947, are described and claimed means for flanging sheet metal plates, strips and the like comprising one or a pair of plates, strips or like members, of a shape corresponding with that of the finished article and adapted to serve as a clamping member, or clamping members, for the work, a plurality of frames adapted to be linked or similarly connected together and to take up positions corresponding with the shape of said clamping member or members, forming rollers and/or discs carried by said frames, an abutment for the interconnected frames and means for moving the clamping member or members and the work through said frames to cause the rollers and/or dies to act progressively on the work. In that construction the abutment may be bifurcated or gapped to give passage to the clamping member or members and the work, and present bearings for the spindle of one or more gear wheels, and the clamping member or one of the clamping members may be formed with one or more series of holes in which the teeth of the gear wheel or wheels may engage.

The present invention, which constitutes an improvement on, or modification of, that prior invention, has for its principal object the provision of modified means for moving the clamping member or members and the work through the frames. These means consist in attaching one end of a cable to the trailing end of a clamping member, forming a groove in said clamping member to receive the cable, mounting on said clamping member a plurality of movable cleats adapted to bridge the groove, providing means for drawing on the cable so as to pull the clamping member or members and the work through the abutment and frames, and providing means for moving said cleats automatically into and out of their operative positions bridging the groove, according as the clamping member is moved in the return or the working direction, so as to retain the cable in the groove, or allow it to leave the groove as it passes from or to a pulley by which it is guided from or to winding or like means.

In order to move the cleats automatically into or out of their operative positions, each cleat may be pivoted near one end to the underside of a clamping member at one side of the groove therein, and may have a pin near its other end projecting from the cleat transversely of the plane in which it may be swung about its pivot and the abutment of the machine may have a fixed cam to co-operate with the pins (or with the cleats) successively to swing the cleats from their operative positions as the clamping member is moved through the abutment in the working direction, and a second cam which may be projected into the path of the pins when the clamping member is moved in the opposite or return direction, said second cam serving to co-operate with the pins successively to swing the cleats into their operative positions as the clamping member is drawn back through the abutment. It is to be understood that the second cam is so situated relatively to the first that it does not act on the pins until after they have passed the first cam during the return movement; further, that the second cam is brought to its inoperative position only during the movement of the clamping member in the working direction, and for this purpose the second cam may be interconnected with the control mechanism of the machine.

Preferably the spindle of the pulley over which the cable passes to and from its winding or like means, is mounted in bearings on the abutment immediately adjacent the two cams.

The invention is illustrated by the accompanying drawings in which Figure 1 is a perspective view of a portion of the known apparatus which has been modified in accordance with the present invention; Figures 2 and 3 are fragmentary sectional inverted plans showing how the cleats are moved from their operative to their inoperative positions and from their inoperative to their operative positions, respectively; and Figures 4 and 5 are cross sectional views taken on the lines 4—4 and 5—5, respectively, of Figure 3.

As shown in Figure 1 $a$ is the abutment of a machine according to the said prior application for Letters Patent, $b$ . . . are the frames carrying the forming rollers and/or dies. The frames $b$ are linked together and to the abutment $a$ as at $c$ . . ., and $d$ is a clamping member of predetermined configuration by which a piece of work $e$ is carried through the machine.

The clamping member $d$ is formed longitudinally at its underside with a groove $f$ in the trailing end of which is located a pin $g$ to which is attached an eye on a cable $h$. To the underside of the clamping member $d$ there are secured strips $j, j$ which close, partially, the groove $f$, leaving only sufficient space for the cable $h$ to pass into and out of the groove $f$. On one of the strips $j$ there are pivotally mounted each at one end as at $k$, a plurality of cleats $m$ . . . , each of which cleats has at its other end a pin $n$ projecting in a direction away from the underside of the clamping member *d* and extending parallel with its pivot *k*.

Figure 1 shows the parts in the positions they occupy during the forming operation that portion of the piece of work *e* at the right hand side of that figure being unformed and that portion at the left hand side being formed. It will be seen that as the clamping piece *d* and the work *e* pass through the abutment *a*, the cleats *m* . . . have been swung from their operative positions bridging the groove *f* (right hand side of Figure 1) to their inoperative positions extending parallel with the strip *j* to which they are attached (left hand side of Figure 1), thereby permitting the cable *h* to leave the groove *f* and pass over and under pulleys *o*, *o* on the abutment *a* and thence to winding means (not shown).

In order to swing the cleats *m* . . . from their operative to their inoperative positions there is provided on the abutment *a* beneath the level of the path of the clamping member *d* therethrough an upwardly extending plate *p* (see Figures 2, 3 and 4) formed with a gap *q*, sufficiently deep to give passage to the cleats *m* . . . and their pins *n* . . . . The edge of plate P at that side of the gap *q* remote from the pivots *k* . . . of the cleats *m* . . . is rouded or beveled as at *r* (see Figures 2 and 3) so that as the cable *h* is drawn from right to left in, Figures 1 and 2, the cleats *m* . . . ride successively over the rounded or beveled part *r* and are thereby turned on their pivots *k* . . . from their operative positions (right hand side of Figure 2) to their inoperative positions (left hand side of Figure 2) so as to allow the cable *h* to turn through 90° round the pulley *o*.

During the return movement of the clamping member *d* the cleats *m* . . . are turned back, successively, from their inoperative positions (left hand side of Figure 3) to their operative positions (right hand side of Figure 3). For this purpose there is provided a retractable cam *s* which is projected across the path of the pins *n* . . . so that as the cable *h* is drawn from left to right, Figures 1 and 3, the cooperation of the cam *s* with the pins *n* . . . turns the cleats *m* . . . , successively, from their inoperative positions (left hand side of Figure 3) to their operative positions (right hand side of Figure 3). It will be observed that the cam *s* is so situated that the cleats *m* . . . in passing to the right in Figs. 1–3 pass over the rounded part *r* successively before their pins *n* . . . engage the cam *s* and, hence, are clear of the plate *p* before they are turned to their operative positions. The cam *s* may be connected with the control mechanism of the machine so that it is moved to its operative position when the clamping member *d* is to be moved back to its initial position.

From the foregoing it will be understood that during the effective part of the operation the clamping member *d* and the piece of work *e* are pulled through the abutment *a* by the cable *h*, and the cleats *m* . . . are moved from their operative to their inoperative positions, the cable *h* being drawn out of the groove *f*. After the work *e* has been removed the clamping member *d* is pulled back (e. g. by hand) and the cleats *m* . . . are moved from their inoperative to their operative positions so that the clamping member *d* is ready for another piece of work to be secured thereto.

We claim:

1. In a device for flanging sheet metal plates, strips and the like and of the type in which a work piece to be formed is moved through a stationary abutment and through forming means with a clamping member having the desired configuration and moving through said forming means from its leading end to its trailing end during its working movement, means for moving said clamping member comprising a groove extending longitudinally of the member, a flexible cable dimensioned to lie within said groove, said cable being attached to the trailing end of said clamping member and passing through said abutment, a plurality of cable retaining members mounted on said clamping member for movement between inoperative positions clear of said groove and operative positions in which they retain said cable within said groove, and means for automatically moving said retaining members to operative position to retain said cable in said groove upon movement of said clamping member through said abutment in a first direction, and means for automatically moving said retaining members to inoperative positions to permit said cable to leave said groove upon movement of said clamping member through said abutment in a second direction opposite to said first direction.

2. Mechanism as set forth in claim 1 in which said retaining members are pivoted to the underside of the clamping member at one side of said groove, said means for moving said cable retaining members to operative position comprising a pin mounted on each cable retaining member and cam means at said abutment for engaging said pins to move said retaining members to operative position, said means for moving said cable retaining members to inoperative position comprising second cam means at said abutment for engaging said retaining members as they pass said abutment, said second direction of movement of said clamping member comprising the direction of working movement of said clamping member, said first direction being the return movement of the clamping member.

3. Mechanism as set forth in claim 2 in which said second cam comprises a fixed cam while said first cam is movable between a retracted position which it occupies during working movement of said clamping member and an operating position which it occupies during return movement of the clamping member, said movable cam when in said operating position being positioned in the path of travel of the pins on said cable retaining members, said movable cam being situated with respect to said fixed cam in such manner that said movable cam, when in its operating position, is engaged by said pins only subsequent their passing the fixed cam.

WILLIAM WHITE MacARTHUR.
GEOFFREY LEONARD
FREEMAN WELHAM.

REFERENCES CITED

The following references are of record in the file of this patent:

UNITED STATES PATENTS

| Number | Name | Date |
| --- | --- | --- |
| 1,698,427 | Brauer | Jan. 8, 1929 |
| 939,264 | Jones | Nov. 9, 1909 |
| 2,400,151 | Kirsch | May 14, 1946 |

FOREIGN PATENTS

| Number | Country | Date |
| --- | --- | --- |
| 625,521 | France | Apr. 25, 1927 |
| 681,618 | Germany | Sept. 27, 1939 |
| 536,935 | Great Britain | May 30, 1941 |